United States Patent [19]
Davis et al.

[11] 3,797,959
[45] Mar. 19, 1974

[54] SHAFT CENTERING MACHINE

[76] Inventors: Floyd O. Davis; Boyce W. Davis, both of 2326 E. Buckeye Rd., Phoenix, Ariz. 85034

[22] Filed: Mar. 29, 1972

[21] Appl. No.: 239,055

[52] U.S. Cl................................. 408/135, 408/99
[51] Int. Cl............................................. B23b 49/04
[58] Field of Search....... 408/135, 129, 72, 99, 103, 408/40

[56] References Cited
UNITED STATES PATENTS

| | | | |
|---|---|---|---|
| 2,545,008 | 3/1951 | Senglet | 408/135 X |
| 2,902,891 | 9/1959 | Wollenhaupt | 408/135 X |
| 635,888 | 10/1899 | Hartness | 408/135 X |
| 2,399,536 | 4/1946 | Baum | 279/114 X |

*Primary Examiner*—Donald R. Schran
*Attorney, Agent, or Firm*—Warren F. B. Lindsley

[57] ABSTRACT

A machine for providing centering holes in shafts to be used on lathes which drills the holes in horizontally mounted shafts placed on a rack and moved into alignment with the cutting tool of the machine.

2 Claims, 4 Drawing Figures

PATENTED MAR 19 1974 3,797,959

3,797,959

SHAFT CENTERING MACHINE

BACKGROUND OF THE INVENTION

This invention relates to machines for cutting centering holes in ends of shafts in preparation for machining on a lathe, and more particularly to a machine having a built-in lathe chuck for quickly repeatedly aligning a cutting tool for moving into longitudinal engagement with a shaft horizontally positioned on a rack.

DESCRIPTION OF THE PRIOR ART

Heretofore, the cutting of centering holes in ends of shafts in preparation for machining on a lathe required extensive machine set up time, whether accomplished on a lathe or a drill press, and did not lend itself to automation so that the cutting operation could be repeated time and time again with minor machine adjustments.

SUMMARY OF THE INVENTION

In accordance with the invention claimed, a new machine configuration is provided for cutting such as by a drilling operation the centering holes in ends of shafts. This machine's novelty lies in the particular combination of elements which make this cutting operation simple to accomplish repeatedly with little or no machine set up time needed by relatively unskilled labor.

It is, therefore, one object of this invention to provide a new machine tool for cutting centering holes in ends of shafts.

Another object of this invention is to provide a new machine tool for shaft centering and centering hole cutting operations on rotatable stock for use on lathes which employs a simplified transmission drive and cutting tool positioning mechanism.

Further objects and advantages of the invention will become apparent as the following description proceeds and the features of novelty which characterize this invention will be pointed out with articularity in the claims annexed to and forming part of this specification.

BRIEF DESCRIPTION OF THE DRAWING

The present invention may be more readily described by reference to the accompanying drawing, in which.

DESCRIPTION OF THE PREFERRED EMBODIMENT

Figure 3:
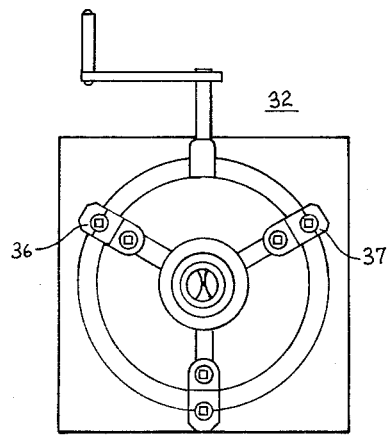
FIG. 3 is a partial left end view of FIG. 1 showing the chucking mechanism.

Referring more particularly to the drawing by characters of reference, FIGS. 1–4 disclose a headstock housing 10 which forms a support for a hollow input shaft or sleeve 11 suitably journalled on a bearing 2 supported on and in the housing. The input shaft 11 carries a pulley 14 at its outer end which is driven by a suitable belting means 15 and drive pulley 16. The drive pulley 16 is mounted on a drive shaft 17 of a motor 18.

Journalled on and within sleeve 11 is a driven shaft 20. Shaft 20 is provided with a ribbed or splined portion 21 extending longitudinally thereof which cooperates with slots 22 arranged within and extending longitudinally of the hollow interior of sleeve 11. By this configuration of sleeve 11 and shaft 20 it is obvious that shaft 20 may move freely longitudinally of and within sleeve 11 but must rotate with sleeve 11 upon rotation thereof.

Figure 2:
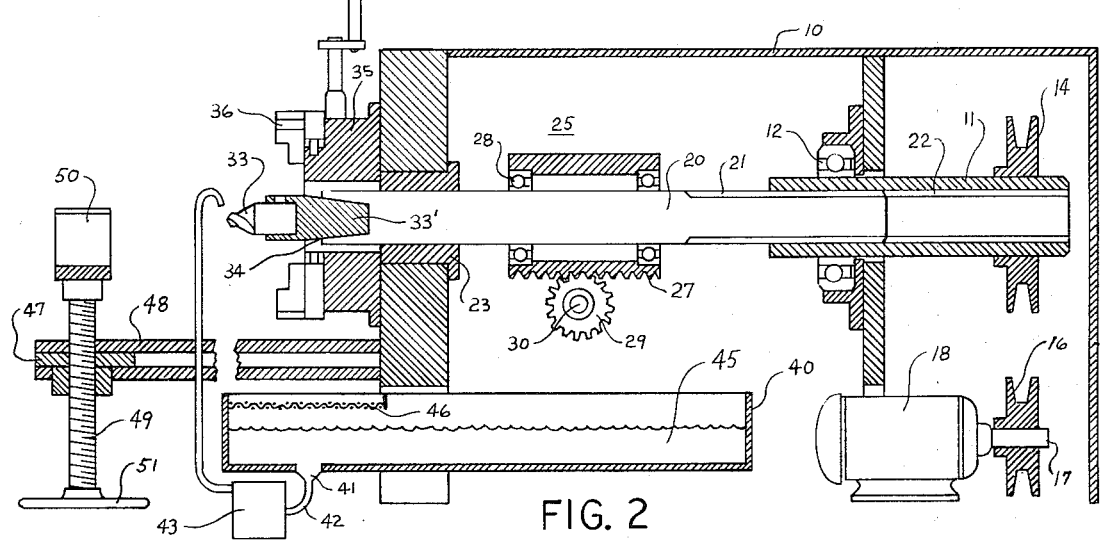
FIG. 2 is an elevational view, partly in section, of the machine shown in FIG. 1.

As noted from FIG. 2 of the drawing, shaft 20 is suitably journalled on a bearing or bushing 23 forming a part of the support furnished by housing 10.

In order to actuate shaft 20 longitudinally of headstock housing 10 and within sleeve 11, a suitable manual actuating means 25 is provided. This actuating means comprises a spur type gear fixedly mounted within headstock housing 10. A cylindrical gear rack 27 is journalled on shaft 20 on suitable bearings 28 and is fixedly attached to shaft 20 such that rotation of spur gear 29 mounted on shaft 30 fixedly attached to headstock housing 10 causing movement of shaft 20 along its longitudinal axis in the manner of the operation of the spindle on a drill press. A lever arm 31 mounted on shaft 30 outside of headstock housing 10 permits movement of shaft 20 relative to sleeve 11.

A clamping mechanism 32 is provided for holding the shaft that is to be centered. This clamping mechanism comprises a well known lathe chuck which in this instance is shown as a three-jaw universal lathe chuck 35 with two-piece reversible top jaws 36 and 37 which fasten to the outer end of the shaft that is to be centered. The chuck 32 is fixedly mounted to headstock housing 10. The centering tool 33 is fixed in collar 33' by a set screw or other suitable means which in turn is fixed in opening 34 of shaft 20.

Figure 4:
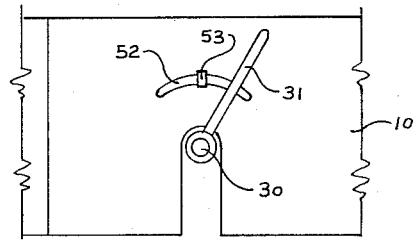
FIG. 4 is a partial front view of the housing surrounding the machine shown in FIG. 1 illustrating the adjustable stop for controlling the longitudinal movement of the cutting tool.
Figure 1:
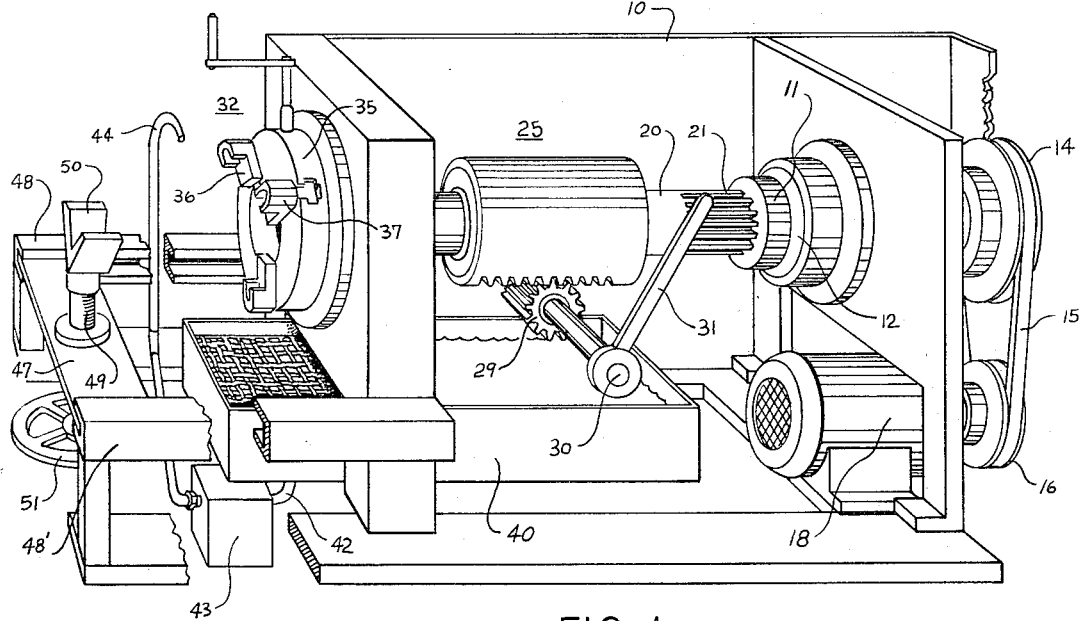
FIG. 1 is a front perspective view of a shaft centering and cutting machine and embodying the invention.

As shown in FIGS. 1, 3 and 4, a drip pan 40 is mounted within the headstock housing 10 beneath the cutting tool 33 and is provided with a drain 41 and drain pipe 42 which is connected through a pump 43 to a discharge nozzle 44 in the area of the cutting tool 33 to cool and lubricate the cutting tool and stock being worked on with a suitable liquid 45 during a cutting operation, as well known in the art. A suitable screen 46 is mounted on the drip pan 40 over the draining area of the cutting tool to catch the clips of the stock and to drain the lubricant into the pan after it has served its cooling purposes.

To aid in properly positioning the stock to be worked on in alignment with the cutting tool 33, a work shelf 47 is slidably mounted in a pair of tracks 48, 48' arranged to extend longitudinally of the headstock housing 10 and outwardly of the cutting tool 33. Work shelf 47 is provided with a shaft 49 extending laterally therethrough and in threaded arrangement therewith for supporting on its upper end a V-shaped work supporting surface 50. The lower end of shaft 49 is provided with a turning wheel 51 for adjustably vertically positioning the work supporting surface 50 with reference to the cutting tool.

Thus, a compact machine tool is provided which is capable of quickly aligning and drilling centering holes in ends of shafts for later use on lathes repeatedly with a minimum amount of set up time.

As shown in FIG. 4 housing 10 may be provided with a slot 52 in its front face adjacent handle or lever arm 31. An adjustably positioned stop 53 is arranged for positioning along slot 52. Arm 31 may be provided with a protrusion (not shown) which moves in slot 52 and by engagement with stop 53 limits the movement of the driven shaft 20 and cutting tool 33 relative to stock mounted in V-shaped surface 50.

Although but one embodiment of the present invention has been illustrated and described, it will be apparent to those skilled in the art that various changes and modifications may be made therein without departing from the spirit of the invention or from the scope of the appended claims.

What is claimed is:

1. A machine tool comprising:
   a support,
   a sleeve journalled in said support,
   a drive shaft connected to rotate said sleeve,
   a driven shaft journalled in said support and splined to slide axially along slots in said sleeve,
   said driven shaft and said sleeve rotating in unison upon rotation of said sleeve,
   cylindrical means mounted around and forming a journal for said driven shaft,
   said cylindrical means being attached to said driven shaft for moving in unison with it longitudinally of its axis,
   means for engaging the outer periphery of said cylindrical means for causing longitudinal movement of said driven shaft relative to said sleeve, and
   a three-jaw universal lathe chuck fixedly mounted on said support at the free end of said driven shaft and in axial alignment therewith for receiving within its jaws at one side of said chuck an item to be worked on,
   said driven shaft when moved relative to said sleeve in one direction, moving into and through said chuck from a side opposite to said one side for engaging in axial alignment the item clamped in said jaws.

2. The machine tool set forth in claim 1 wherein:
   said means for engaging the outer periphery of said cylindrical means for causing longitudinal movement of said driven shaft relative to said sleeve comprises a rack gear mounted in grooves on the outer periphery of said cylindrical means, a spur gear mounted in meshing engagement with said rack gear, and a handle means connected to said spur gear for rotating it to cause longitudinal movement of said driven shaft relative to said sleeve.

* * * * *